United States Patent Office 2,995,566
Patented Aug. 8, 1961

2,995,566
PREPARATION OF TRYPTAMINE
DERIVATIVES
Meyer Sletzinger, North Plainfield, William V. Ruyle, Scotch Plains, and Walter A. Gaines, Rahway, N.J., assignors to Merck & Co., Inc., Rahway, N.J., a corporation of New Jersey
No Drawing. Filed Feb. 8, 1957, Ser. No. 638,911
5 Claims. (Cl. 260—319)

This invention relates to tryptamine compounds, more particularly to tryptamine compounds having activity as serotonin antagonists, and to processes for making the same.

Serotonin, which is also known as 3-(2-aminoethyl)-5-hydroxyindole and 5-hydroxytryptamine, is present in the blood serum and in the brain of man and other mammals. This compound appears to be necessary for proper functioning of the central nervous system. However, this compound causes various undesirable side effects, notably high blood pressure, when an excessive amount of this compound is present in the system.

High blood pressure and other undesirable symptoms of excessive amounts of serotonin in the system can be controlled by the administration of a serotonin antagonist. Certain derivatives of serotonin, notably 1-benzyl-2-methyl-3-(2-aminoethyl)-5-methoxyindole, have activity as serotonin antagonists. Prior to the present invention the only known methods for making these serotonin antagonist compounds were involved and had a low overall yield.

An object of the present invention is to provide a new process for making serotonin derivatives having serotonin antagonist activity.

A further object of the present invention is to prepare new tryptamine compounds having a greater serotonin antagonist activity than presently known tryptamine compounds.

These and other objects will be apparent from the specification which follows.

The tryptamine compounds having serotonin antagonist activity which may be prepared according to the process of the present invention have the general formula

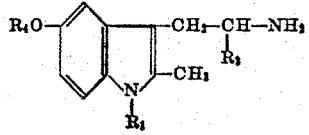

and the acid addition salts thereof. In the above structural formula $R_1$ is selected from the group consisting of hydrogen and the benzyl radical, $R_3$ is selected from the group consisting of hydrogen and the methyl radical, and $R_4$ is selected from the group consisting of the methyl and benzyl radicals. The acid addition salt may be any of the common acid addition salts such as the hydrochloride, sulfate, or acetate.

According to the process of this invention a phenylhydrazine compound is combined with a haloalkyl ketone in an acidic organic solvent medium to form an indole having a haloalkyl side chain attached to the 3-position. This product is then reacted with an alkali metal salt of a cyclic organic imide to form the corresponding indole having an imidoalkyl side chain at the 3-position. The imido group is removed by reaction with hydrazine, yielding the desired tryptamine compound. The equation for this reaction may be represented as follows:

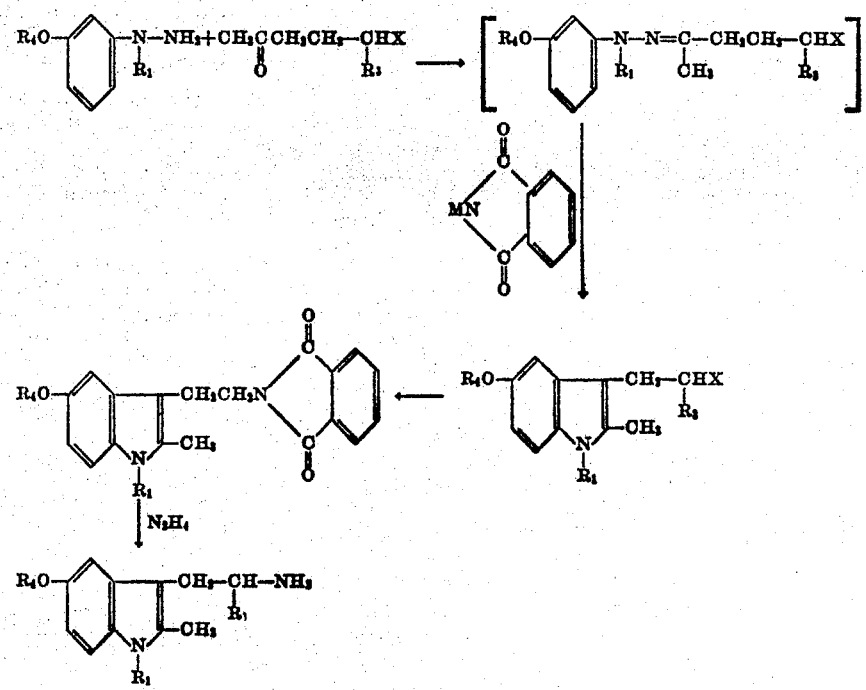

In the above equation X is a halogen having an atomic weight in the range of 35 to 80, that is, X is either chlorine or bromine, M is an alkali metal, and $R_1$, $R_3$, and $R_4$ are as defined above. While the final product has been indicated as the free tryptamine compound in the above equation, it is understood that the tryptamine compound may be recovered either as such or as an acid addition salt, preferably as the latter.

Examples of the phenylhydrazine compounds which may be used as reagents in the process of the invention are p-methoxyphenylhydrazine, p-benzyloxyphenylhydrazine, 1-benzyl-1-(p-methoxyphenyl)hydrazine, and 1-benzyl-1-(p-benzyloxyphenyl)hydrazine. Other phenylhydrazine compounds in which $R_1$ and $R_4$ are as defined above are also suitable reagents. The phenylhydrazine compound may be in the form of an acid addition salt, such as the hydrochloride or sulfate, rather than as the free base, if desired.

The compound p-methoxyphenylhydrazine cited above may be prepared by the process disclosed in Blaikie and Perkin, J. Chem. Soc. (London), volume 125, pages 296, 313, (1924). The compound p-benzyloxyphenylhydrazine may be prepared by the procedure disclosed by Mentzer, Beaudet, and Bory, Bull. Soc. Chim., volume 1953, pages 421 to 423 (1953). These compounds may be alkylated or benzylated according to the procedure of Audrieth et al., J. Org. Chem., volume 6, page 417 (1941), or according to the Audrieth procedure as modified by Shaw, J. Am. Chem. Soc., volume 77, page 4319 (1955). Other phenylhydrazine compounds can also be made according to these procedures.

Ketones which are suitable reagents in the present invention are 5-chloropentanone-2, 5 - bromopentanone-2, 5-chlorohexanone-2, and 5-bromohexanone-2. These compounds, it will be noted, have an active methylene group adjacent to the ketonic group.

The reaction between the phenylhydrazine compound and the ketone is carried out in an acidic solvent medium. Preferably the solvent is an organic solvent. The lower aliphatic alcohols, such as methanol, ethanol, propanol, isopropanol, and the butyl alcohols are particularly desirable as solvents. Another suitable solvent is glacial acetic acid. In the event that the organic solvent is not an acid, the solvent is acidified by the addition of an acidic compound, preferably in anhydrous form. Examples of suitable acidic compounds for this purpose are hydrochloric, hydrobromic, and sulfuric acids, zinc chloride, and boron trifluoride.

The reaction between the phenylhydrazine compound and the ketone results in an intermediate haloalkylindole having the general formula

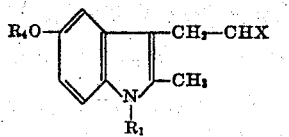

where $R_1$, $R_2$, $R_3$, $R_4$, and X are as defined above.

Among the haloalkyl indoles which may be formed according to the present invention are 1-benzyl-2-methyl-3-(2-chloroethyl)-5-methoxyindole, 2-methyl-3-(2 - chloroethyl)-5-methoxyindole, 1 - benzyl-2-methyl-3-(2-chloropropyl)-5-methoxyindole, 1 - benzyl - 2 - methyl-3-(2-chloroethyl) - 5 - benzyloxyindole, and 1-benzyl-2-methyl-3-(2-chloropropyl)-5-benzyloxyindole. The corresponding bromoalkyl indoles, such as 1-benzyl-2-methyl-3-(2-bromoethyl)-5-methoxyindole, and 1-benzyl-2-methyl-3-(2-bromopropyl)-5-methoxyindole, can also be formed.

The ketone and phenylhydrazine compound condense to form the indole directly in the preferred embodiment of this invention. The corresponding phenylhydrazone is formed as an intermediate, but immediately cyclizes to form the indole and is not isolated. However, the phenylhydrazone may be formed under conditions not conducive to indole formation and isolated. The phenylhydrazone is then placed in an acidic medium where it cyclizes to form the indole.

The haloalkyl indole is combined with phthalimide, or an alkali metal salt thereof, in an organic solvent such as dimethylformamide, ethanol, or isopropanol. The reaction medium is alkaline, preferably mildly alkaline. The medium may be made alkaline by the addition of a basic compound such as potassium carbonate. Alternatively an alkali metal salt of the imide, as for example potassium phthalimide, may be used as the reagent in lieu of the free imide and a base. In either event the imide, as it undergoes reaction, is in the form of the alkali metal salt.

Among the imidoalkyl indoles which may be formed according to the present invention are 1-benzyl-2-methyl-3-(2-phthalimidoethyl) - 5 - methoxyindole, 2-methyl-3-(2-phthalimidoethyl)-5-methoxyindole, 1-benzyl-2-methyl 3-(2-phthalimidopropyl)-5-methoxyindole, 1 - benzyl - 2-methyl-3-(2-phthalimidoethyl)-5-benzyloxyindole, and 1-benzyl - 2-methyl-3-(2-phthalimidopropyl)-5-benzyloxyindole.

The next step in the process of the present invention is to convert the imidoalkyl indole to the corresponding tryptamine compound. This is done by reacting the imidoalkyl indole with hydrazine. This reaction may be carried out in a suitable solvent such as methanol, ethanol, the other lower aliphatic alcohols, aqueous alcohol, water, ethylene glycol, dioxane, and tetrahydrofuran. This reaction is carried out at elevated temperature, for example, reflux temperature. The hydrazine may be in the form of either the free compound or the hydrate. The reaction medium may be essentially neutral or slightly basic.

Examples of tryptamine compounds which may be formed are 1-benzyl-2-methyl-3-(2-aminoethyl)-5-methoxyindole, 2-methyl - 3 - (2-aminoethyl)-5-methoxyindole, 1 - benzyl-2-methyl-3-(2-aminopropyl)-5-methoxyindole, 1 - benzyl-2-methyl-3-(2-aminoethyl)-5-benzyloxyindole, and 1 - benzyl-2-methyl-3-(2-aminopropyl)-5-benzyloxyindole.

The tryptamine compound may be recovered from the reaction product mixture by conventional means. The product may be recovered either as the free amine or as an acid addition salt such as the hydrochloride, sulfate, or acetate.

The invention will now be described with reference to the specific examples which follow.

Example 1

A mixture of 26.5 g. of 1-benzyl-1-(p-methoxyphenyl)-hydrazine hydrochloride, 12 g. of 5-chloropentanone-2, and 250 ml. of absolute ethanol was heated at reflux for 15 minutes. To this mixture were added 13 ml. of 7.8 N solution of hydrogen chloride in ethanol. Heating was continued at reflux temperature for 30 minutes. The reaction mixture was concentrated to a small volume in vacuo. The residue was added to a mixture of 100 ml. of benzene and 100 ml. of water and the resulting mixture was shaken and then allowed to separate. The aqueous layer was then separated from the benzene layer in which the 1-benzyl-2-methyl-3-(2-chloroethyl)-5-methoxyindole product was dissolved. The aqueous layer was extracted with two 50-ml. portions of benzene. The two portions of benzene were combined with the benzene solution of the product and washed with 50 ml. of water. A small amount of ethanol was added to clarify the layers. The resulting benzene solution was dried over anhydrous magnesium sulfate. The benzene was then removed by vacuum distillation. The product, which was 1-benzyl - 2 - methyl-3-(2-chloroethyl)-5-methoxyindole, was recrystallized from 100 ml. of absolute ethanol. Yield 21.1 g. (67.3%); M.P. 83°–86° C.

Example 2

A mixture consisting of 26.5 g. of (0.10 mole) of 1-benzyl - 1 - (p-methoxyphenyl)hydrazine hydrochloride, 13.5 g. (0.10 mole) of 5-chlorohexane-2, 250 ml. of absolute ethanol, and 25 ml. of 7.8 N ethanolic hydrogen chloride were heated at reflux for 20 minutes. This mixture was gradually cooled while 200 ml. of water were added. An oily water-immiscible product was formed. This product, which was crude 1-benzyl-2-methyl-3-(2-chloropropyl)-5-methoxyindole, crystallized on standing. The crude product was filtered and washed with 50% aqueous ethanol to give 24.4 grams.

The crude product was recrystallized, first from 120 cc. of ethanol, and then from an aliphatic hydrocarbon fraction consisting essentially of n-heptane using 1 g. of activated carbon. Yield 12.5 g.; M.P. 96°–98.5° C.

Example 3

A mixture of 6.28 g. of 1-benzyl-2-methyl-3-(2-chloroethyl)-5-methoxyindole, 5.55 g. of potassium phthalimide, and 20 ml. of dimethylformamide was heated at 95° C. for one hour. At the end of this period, 100 ml. of water were added. The mixture was cooled to approximately room temperature and 10 ml. of 30% aqueous sodium hydroxide were added. The mixture was further cooled to about 25° C. with stirring. The crude product was filtered and then triturated with a small volume of ethanol. The product, 1-benzyl-2-methyl-3-(2-phthalimidoethyl)-5-methoxyindole was recrystallized from 10 ml. of glacial acetic acid. Yield 3.5 g.; M. P. 155°–157° C.

The procedure described in Example 3 may be used for the preparation of other imidoalkyl indoles according to this invention from the corresponding haloalkyl indole and an alkali metal salt of a cyclic organic imide. For example, the following phthalimidoalkyl indoles may be formed by the reaction of the corresponding chloroalkyl indole with potassium phthalimide: 2-methyl-3-(2-phthalimidoethyl) - 5 - methoxyindole, 2 - methyl - 3-(2-phthalimidopropyl) - 5 - methoxyindole, 2-methyl - 3 - (2-phthalimidoethyl) - 5 - benzyloxyindole, 1 - benzyl - 2-methyl-3-(2-phthalimidoethyl) - 5 - benzyloxyindole, and 1-benzyl - 2 - methyl - 3 - (2 - phthalimidopropyl)-5-benzyloxyindole.

Example 4

A mixture of 500 g. of 1 - benzyl - 2 - methyl - 3-(2-phthalimidoethyl)-5-methoxyindole, 5 liters of methanol and 130 ml. of 85% aqueous hydrazine hydrate was heated at reflux until solution occurred and then for one additional hour. The total heating time was 2¾ hours. To the reaction mixture 2.5 liters of water were added, and approximately 3.5 liters of methanol were removed by vacuum distillation. Five liters of water and 250 ml. of glacial acetic acid were added and the mixture was heated on a steam bath at 90°–95° C. for 30 minutes. The mixture was then cooled to 50° C. and filtered on a thin precoat of a filter aid. The filter cake was washed with 2 liters of water at a temperature of 50° C. The filtrate was cooled to 20°–25° C., and 1.5 liters of ether were added. The stirred mixture was made alkaline by the addition of about 500 ml. of 30% aqueous sodium hydroxide solution. The layers were separated and the aqueous layer was extracted with two portions of 1.5 liters each of ether. The ether extracts were combined, washed with 200 ml. of water and then acidified with approximately 350 ml. of 2 N ethanolic hydrogen chloride. The resulting suspension was stirred for 30 minutes and the product was filtered and washed with three 400-ml. portions of ether. The product was dried in vacuo to yield 363.5 g. of crude 1-benzyl-2-methyl-3-(2-aminoethyl)-5-methoxyindole hydrochloride, M.P. 241°–243° C. Recrystallization from ethanol using 10 ml. per gram of product yielded the pure product in 80%—87% yield; M.P., 243°–244.5° C. Comparison of the ultraviolet and infra-red spectrum with the spectra of an authentic sample showed that both spectra were identical.

Analysis.—Calculated for $C_{19}H_{23}N_2OCl$: C, 68.98%; H, 7.01%; N, 8.47; Cl, 10.7%. Found: C, 69.02%; H, 6.94%; N, 8.68%; Cl, 10.6%.

Example 5

A mixture of 1.6 g. of 2-methyl-3-(2-phthalimidoethyl)-5-methoxyindole, 25 ml. of methanol, and 0.6 ml. of 85% aqueous hydrazine hydrate was refluxed for one hour. The reaction product mixture was diluted with 12 ml. of water and the methanol was removed by vacuum distillation. To the residue was added 13 ml. of concentrated hydrochloric acid. The mixture was heated at reflux for one hour and cooled. After the addition of 50 ml. of ether, the stirred mixture was made alkaline by the addition of 6 N sodium hydroxide. The layers were separated and the aqueous layer was extracted twice with 25-ml. portions of ether. The ether extracts were combined and dried over magnesium sulfate. The ether extract was then acidified barely to the point of neutrality by the addition of approximately 1.5 ml. of 2 N ethanolic hydrogen chloride. The product, 2-methyl-3-(2-aminoethyl)-5-methoxyindole hydrochloride, was formed on the addition of the ethanolic hydrogen chloride. Initially the product was an oil but it solidified on standing overnight. The solid was filtered and recrystallized from a mixture of 20% ethanol and 80% methyl isobutyl ketone. Yield 370 mg.; M.P. 183°–185° C. The melting point was not depressed on admixture with a sample of authentic material.

Example 6

A mixture of 45 g. of 2-methyl-3-(2-phthalimidoethyl)-5-benzyloxyindole, 15 ml. of 85% aqueous hydrazine hydrate, and 225 ml. of methanol was heated at reflux for two hours. After 30 minutes the reagents were completely dissolved. After the heating period 110 ml. of water were added, and about 150 ml. of methanol were removed in vacuo. The mixture was then diluted with 248 ml. of an acetic acid solution made by dissolving 23 ml. of glacial acetic acid in 225 ml. of water. The resulting slurry was heated on a steam cone for 30 minutes. The mixture was filtered while at a temperature of 50° C. through a pad of diatomaceous earth. The filter cake was washed with two 50-ml. portions of water at 50° C. The filtrate was cooled to 25° C., made alkaline by the addition of 30% aqueous sodium hydroxide. The product was extracted from solution with three 150 ml. portions of ether. The ether portions were combined, dried with magnesium sulfate, concentrated to 75 ml. and cooled to 5° C. The product, 2-methyl - 3 - (2 - aminoethyl) - 5 - benzyloxyindole precipitated and was filtered. Yield 21.5 g., M.P. 112°–113.5° C. A 10-gram portion of the crude product was recrystallized by dissolving in 40 ml. of ethyl acetate, and adding petroleum ether until the solution was turbid. This required 20 ml. of petroleum ether. The product, 2-methyl-3-(2-aminoethyl) - 5 - benzyloxy indole was recovered as the free base. Yield 9.16 g.; M.P. 114°–115° C.

A solution of 2-methyl-3-(2-aminoethyl)-5-benzyloxyindole in ether was acidified by the addition of ethanolic hydrogen chloride. This caused 2-methyl-3-(2-aminoethyl)-5-benzyloxyindole hydrochloride to precipitate. The melting point of the hydrochloride is from 209°–211° C.

The procedures of Examples 4, 5, and 6 may be used to obtain other aminoalkyl indoles from the corresponding phthalimidoalkyl indoles. Aminoalkyl indoles which may be thus formed include the following: 2-methyl-3-(2-aminoethyl)-5-methoxyindole, 1 - benzyl-2-phenyl-3-(2-aminoethyl) - 5 - methoxyindole, 2-methyl-3-(2-aminopropyl)-5-methoxyindole, 2-methyl-3-(2-aminoethyl)-5-benzyloxyindole, 1-benzyl-2-methyl-3-(2-aminoethyl)-5-benzyloxyindole, and 1 - benzyl - 2 - methyl-3-(2-amino propyl)-5-benzyloxyindole.

While this invention has been described with reference to specific embodiments thereof, it is understood that the scope of this invention shall be limited only by the scope of the appended claims.

What is claimed is:

1. A process for preparing tryptamine compounds of the formula

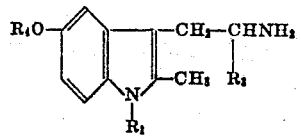

where $R_1$ is selected from the group consisting of hydrogen and benzyl, $R_3$ is selected from the group consisting of hydrogen and methyl, and $R_4$ is selected from the group consisting of methyl and benzyl, which comprises contacting a phenylhydrazine compound of the group consisting of compounds of the formula

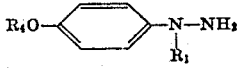

where $R_1$ and $R_4$ are as previously defined, and the mineral acid addition salts thereof with a ketone having the formula

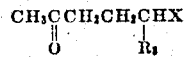

where $R_3$ is as previously defined and X is a halogen having an atomic weight in the range of 35 to 80 in an acidic solvent medium selected from the group consisting of acidified lower alkanols and acetic acid, thereby forming a haloalkyl indole of the formula

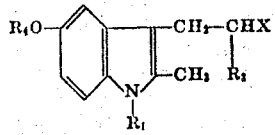

where $R_1$, $R_3$, $R_4$, and X are as previously defined, contacting said haloalkyl indole with an alkali metal phthalimide in an alkaline inert organic solvent medium to form a phthalimidealkyl indole of the formula

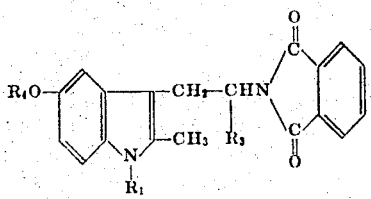

where $R_1$, $R_3$, and $R_4$ are as previously defined, and reacting said compound with hydrazine to form the corresponding tryptamine compound.

2. A process for preparing 1-benzyl-2-methyl-3-(2-aminoethyl)-5-methoxyindole which comprises contacting 1-benzyl-1-(p-methoxyphenyl)hydrazine hydrochloride with 5-chloropentanone-2 in an acidic lower aliphatic alcoholic solvent medium selected from the group consisting of acidified lower alkanols and acetic acid, thereby forming 1-benzyl - 2 - methyl-3-(2-chloroethyl)-5-methoxyindole, contacting said compound with an alkali metal phthalimide in an alkaline inert organic solvent medium to form 1-benzyl - 2 - methyl-3-(2-phthalimidoethyl)-5-methoxyindole, and contacting said compound with hydrogen to form 1-benzyl-2-methyl-3-(2-aminoethyl)-5-methoxyindole.

3. A process for preparing phthalimidoalkyl indoles of the formula

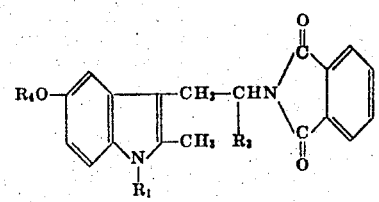

where $R_1$ is selected from the group consisting of hydrogen and benzyl, $R_3$ is selected from the group consisting of hydrogen and methyl, and $R_4$ is selected from the group consisting of methyl and benzyl, which comprises contacting a phenylhydrazine compound of the group consisting of compounds of the formula

and the mineral acid addition salts thereof, where $R_1$ and $R_4$ are as previously defined, with a ketone of the formula

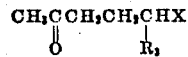

where $R_3$ is as previously defined and X is a halogen having an atomic weight in the range of 35 to 80 in an acidic solvent selected from the group consisting of acidified lower alkanols and acetic acid, thereby forming a haloalkyl indole of the formula

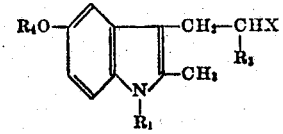

where $R_1$, $R_3$, $R_4$, and X are as previously defined, and contacting said haloalkyl indole with an alkali metal phthalimide in an alkaline inert organic solvent medium to form the corresponding phthalimidoalkyl indole.

4. A process for preparing 1-benzyl-2-methyl-3-(2-phthalimidoethyl)-5-methoxyindole which comprises contacting 1-benzyl-1-(p-methoxyphenyl)hydrazine hydrochloride with 5-chloropentanone-2 in an acidic lower alkyl alcoholic solvent medium, thereby forming 1-benzyl-2-methyl-3-(2-chloroethyl)-5-methoxyindole, and contacting said compound with an alkali metal phthalimide in an alkaline inert organic solvent medium to form 1-benzyl-2-methyl-3-(2-phthalimidoethyl)-5-methoxyindole.

5. 1 - benzyl - 2 - methyl-3-(2-phthalimidoethyl)-5-methoxyindole.

References Cited in the file of this patent

UNITED STATES PATENTS

| | | |
|---|---|---|
| 2,068,800 | Herdieckerhoff et al. | Jan. 26, 1937 |
| 2,416,258 | Jenkins et al. | Feb. 18, 1947 |
| 2,508,927 | Moe et al. | May 23, 1950 |
| 2,532,047 | Warner et al. | Nov. 28, 1950 |
| 2,804,462 | Speeter | Aug. 27, 1957 |
| 2,814,625 | Speeter | Nov. 26, 1957 |
| 2,825,734 | Speeter | Mar. 4, 1958 |

OTHER REFERENCES

Kermack et al.: Jour. Chem. Soc. (London), vol. 121, page 1878 (1922).

Manske: J. Am. Chem. Soc., vol. 51, pages 1202–04 (1929).

Murphy: Jour. Am. Pharm. Assoc., vol. 32, pages 83–89 (1943).

Barber et al.: J. Chem. Soc., pages 1331–37 (1947).

Gardner et al.: J. A.C.S., vol. 69, page 3088 (1947).

Ind. and Eng. Chem., vol. 39, No. 11, page 1420 (1947).

Mattocks Jr., et al.: Am. Chem. Soc., vol. 70, page 3474 (1948).

Shaw et al.: Journal American Chemical Society, pages 1877–1880 (1953).